US008763973B2

(12) United States Patent
Musselman

(10) Patent No.: US 8,763,973 B2
(45) Date of Patent: Jul. 1, 2014

(54) CABLE CATCHER

(71) Applicant: Mammoet Canada Holdings Inc., Ayr (CA)

(72) Inventor: Ken Musselman, Ayr (CA)

(73) Assignee: Mammoet Canada Holdings Inc., Ayr (CA)

(*) Notice: Subject to any disclaimer, the term of this patent is extended or adjusted under 35 U.S.C. 154(b) by 50 days.

(21) Appl. No.: 13/648,405

(22) Filed: Oct. 10, 2012

(65) Prior Publication Data
US 2014/0097302 A1    Apr. 10, 2014

(51) Int. Cl.
*A47F 5/00* (2006.01)

(52) U.S. Cl.
USPC ............................. 248/351; 248/58; 182/2.11

(58) Field of Classification Search
USPC ...................... 248/49, 58, 351, 544; 414/680;
182/2.11, 2.8, 2.9, 2.4; 212/292
See application file for complete search history.

(56) References Cited

U.S. PATENT DOCUMENTS

| 1,525,837 | A | | 2/1925 | Walker et al. | |
|---|---|---|---|---|---|
| 1,831,306 | A | | 11/1931 | Kakimoto | |
| 2,783,025 | A | * | 2/1957 | Scheidt | 254/396 |
| 3,146,853 | A | | 9/1964 | Eckels | |
| 3,407,011 | A | * | 10/1968 | Zeidler | 384/54 |
| 3,809,182 | A | | 5/1974 | Wilson | |
| 3,834,560 | A | * | 9/1974 | Miller | 414/23 |
| 4,175,903 | A | * | 11/1979 | Carson | 414/408 |
| 4,203,687 | A | * | 5/1980 | Sumner | 405/170 |
| 4,466,506 | A | | 8/1984 | Dolenti | |
| 4,493,426 | A | * | 1/1985 | Sterner | 212/261 |
| 4,721,213 | A | | 1/1988 | Eitel | |
| 5,018,929 | A | * | 5/1991 | Carson | 414/408 |
| 5,076,449 | A | | 12/1991 | Clutter | |
| 5,092,731 | A | * | 3/1992 | Jones et al. | 414/406 |
| 5,286,159 | A | * | 2/1994 | Honma | 414/728 |
| 5,348,118 | A | * | 9/1994 | Franklin et al. | 182/187 |
| 5,538,207 | A | | 7/1996 | O'Connell et al. | |
| 5,711,565 | A | * | 1/1998 | Smith et al. | 294/198 |
| 5,720,589 | A | * | 2/1998 | Christenson et al. | 414/408 |
| 5,863,086 | A | * | 1/1999 | Christenson | 294/106 |
| 5,988,970 | A | * | 11/1999 | Holtom | 414/408 |
| 6,012,895 | A | * | 1/2000 | Smith et al. | 414/810 |
| 6,139,244 | A | * | 10/2000 | VanRaden | 414/408 |
| 6,213,706 | B1 | * | 4/2001 | Christenson | 414/408 |
| 6,460,652 | B1 | * | 10/2002 | Piipponen | 182/2.9 |
| 6,510,376 | B2 | * | 1/2003 | Burnstein et al. | 701/117 |
| 6,972,902 | B1 | * | 12/2005 | Chen et al. | 359/429 |

(Continued)

*Primary Examiner* — Terrell McKinnon
*Assistant Examiner* — Daniel Breslin
(74) *Attorney, Agent, or Firm* — Norton Rose Fulbright Canada LLP; Paul J. Field

(57) ABSTRACT

A cable catching device, for installation on a crane boom to catch at least one cable, suspended above at least part of the device when the device is deployed by the crane boom, in the event that the cable falls downwardly, the device having: a base operable with connectors to releasably engage with the crane boom; a post having: a lower end engaged with the base; and an upper end extending beyond the base; a yoke having at least two arms extending upwardly from the upper end of the post, each arm having an upper end laterally spaced apart from the upper end of any adjacent arm, thereby defining an upwardly open yoke mouth between the upper ends of the arms, the yoke mouth being deployed adjacent an underside of the suspended cable wherein the arms are disposed a distance from the suspended cable; and each arm having an arm roller with an outer cable contact surface.

11 Claims, 4 Drawing Sheets

(56) References Cited

U.S. PATENT DOCUMENTS

| | | | |
|---|---|---|---|
| 7,007,929 B2* | 3/2006 | Kwon | 254/395 |
| 7,037,061 B2* | 5/2006 | Hund et al. | 414/408 |
| 7,066,514 B2* | 6/2006 | Smith et al. | 294/106 |
| 7,362,965 B2* | 4/2008 | Clark | 396/56 |
| 8,052,098 B1* | 11/2011 | Kowaleski | 248/49 |
| 8,226,069 B2* | 7/2012 | Devine et al. | 254/134.3 PA |
| 8,282,080 B2* | 10/2012 | Ballard | 254/134.3 R |
| 8,342,483 B1* | 1/2013 | Manning | 254/134.3 R |
| 8,585,020 B2* | 11/2013 | Devine et al. | 254/134.3 PA |
| 8,704,396 B2* | 4/2014 | Leijon et al. | 290/53 |
| 2001/0046430 A1* | 11/2001 | Bayne | 414/408 |
| 2009/0095522 A1* | 4/2009 | Barthold | 174/40 TD |

* cited by examiner

CABLE CATCHER

TECHNICAL FIELD

The invention relates to a cable catching device used to prevent overhead electric power cables and the like from falling on a roadway, a railway track, or into a river during cable installation or maintenance.

BACKGROUND OF THE ART

The installation and maintenance of outdoor electric power supply lines includes passing cables over roads, rails, bodies of water and other structures. In the event that such cables break or fall unintentionally, the result is often serious physical damage, risk of electrocution, and emergency closure of the road or railway. Of course the same concerns apply to overhead communication cables, telephone lines, cable television cables etc.

To prevent such occurrences, electrical workers erect temporary frames on both sides of a road for example. The temporary frames are made of vertical utility poles with horizontal poles or horizontal wires to catch any falling cables and prevent the cables from touching the road surface. Road traffic can continue without interruption during work on the overhead cables that cross the road since the temporary frames serve to catch any cables that break or fall before they can touch the road surface or any vehicles.

Constructing and removing temporary frames made of utility poles requires significant time, lifting equipment and labour. Workers building temporary frames are exposed to falling hazards and the risk of accidentally contacting the electric cables that pass over the frames as they are being assembled and disassembled. The time and effort required to erect and remove temporary frames can often be out of proportion to the work on electric cables themselves.

Prior art devices also exist to lift cables temporarily during replacement of utility pole insulators or other work on cables, for example as shown in U.S. Pat. No. 5,076,449 to Clutter and U.S. Pat. No. 4,721,213 to Eitel among many others.

Features that distinguish the present invention from the background art will be apparent from review of the disclosure, drawings and description of the invention presented below.

DISCLOSURE OF THE INVENTION

The invention provides a cable catching device, for installation on a crane boom to catch at least one cable, suspended above at least part of the device when the device is deployed by the crane boom, in the event that the cable falls downwardly, the device having: a base operable with connectors to releasably engage with the crane boom; a post having: a lower end engaged with the base; and an upper end extending beyond the base; a yoke having at least two arms extending upwardly from the upper end of the post, each arm having an upper end laterally spaced apart from the upper end of any adjacent arm, thereby defining an upwardly open yoke mouth between the upper ends of the arms, the yoke mouth being deployed adjacent an underside of the suspended cable wherein the arms are disposed a distance from the suspended cable; and each arm having an arm roller with an outer cable contact surface.

DESCRIPTION OF THE DRAWINGS

In order that the invention may be readily understood, one embodiment of the invention is illustrated by way of example in the accompanying drawings.

Further details of the invention and its advantages will be apparent from the detailed description included below.

DETAILED DESCRIPTION OF PREFERRED EMBODIMENTS

Figure 1:
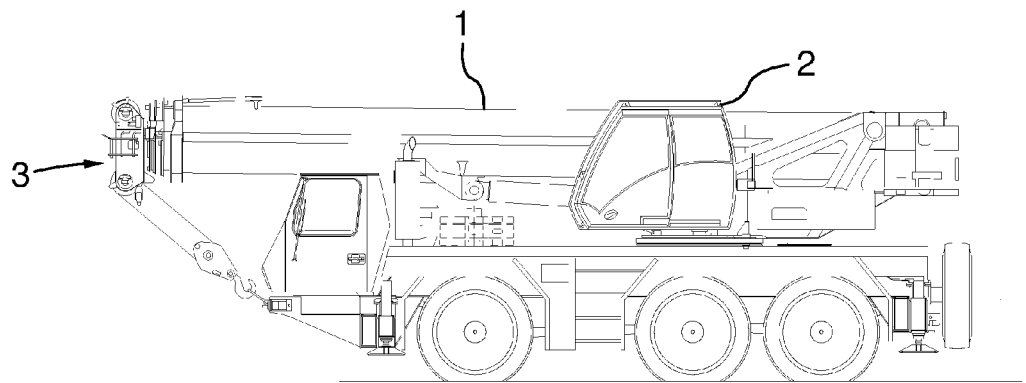
FIG. 1 is a left side view of a prior art mobile crane being an example of a crane to which the cable catcher may be mounted for operation on the boom head.
Figure 2:
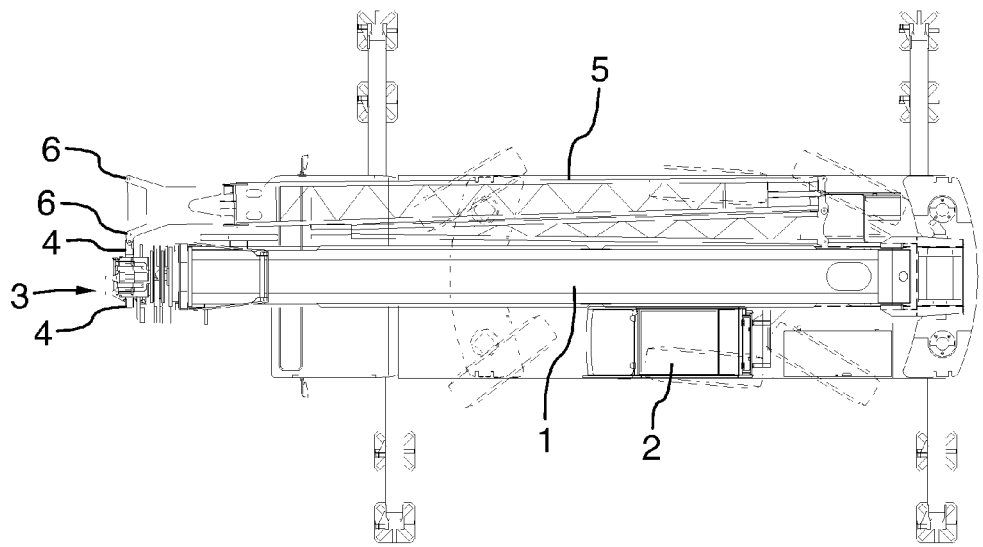
FIG. 2 is a top view of the prior art mobile crane of FIG. 1 showing the boom head with a lattice jib boom stowed laterally adjacent the side of the telescoping boom and mounted to the boom head on two of four connecting pins and connecting brackets.

FIG. 1 shows a left side view of a prior art example mobile crane which is common to the industry having a telescoping main boom 1, operators cab 2 and boom head 3. The boom head 3 includes cable sheaves for suspending the crane hook, but also includes laterally extending boom head brackets 4 for mounting the lattice jib boom 5. In the example illustrated in FIGS. 1-2, the lattice jib boom 5 is folded in half and stowed laterally adjacent the side of the telescoping main boom 1. The jib boom 5 has mating jib boom brackets 6 to be mounted for lifting operations to the boom head brackets 4 with four removable connecting pins. In FIG. 2 the jib boom 6 is hingedly stowed on two of the brackets 4, 6 to swing into an axially aligned operating position when needed to engage the other two brackets 4, 6 and be secured with two more pins.

Figure 3:
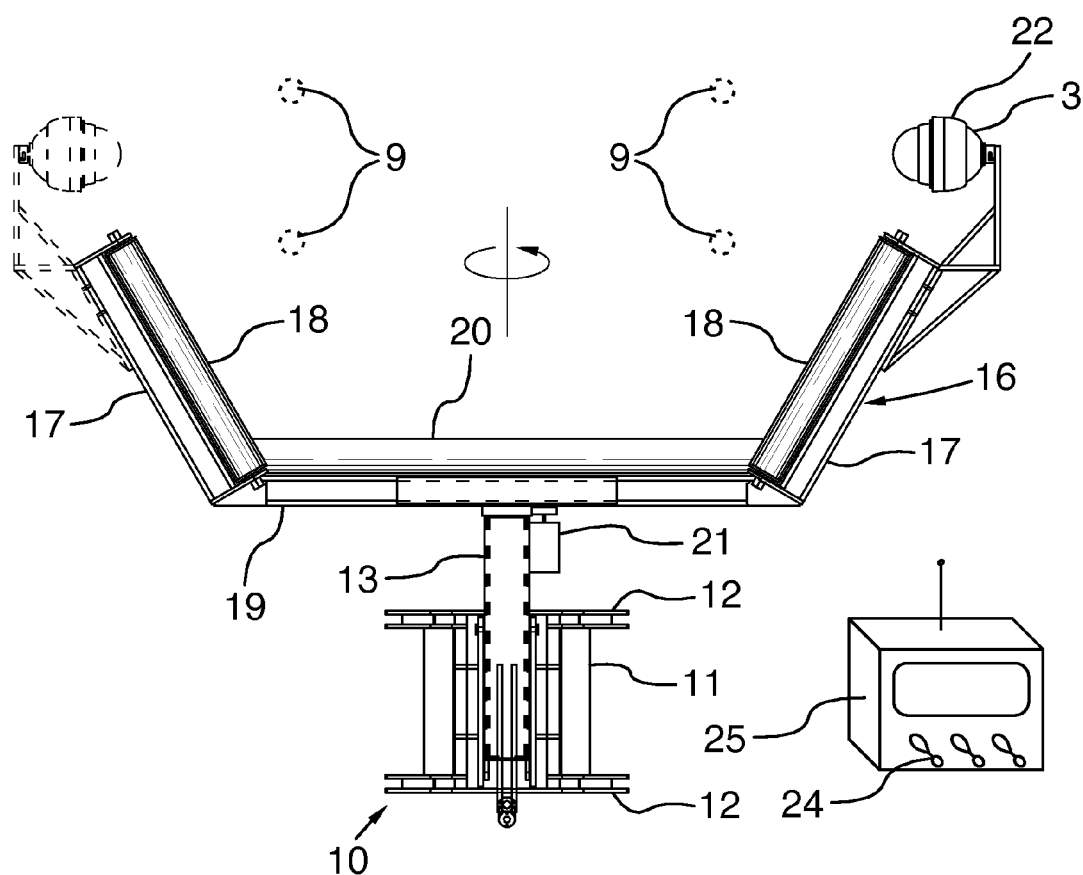
FIG. 3 is a front view of the cable catching device with base, post, lateral beam and arms forming a yoke, the base having brackets and holes to mate the four connecting pins and connecting brackets of the boom head example in FIG. 2.
Figure 4:
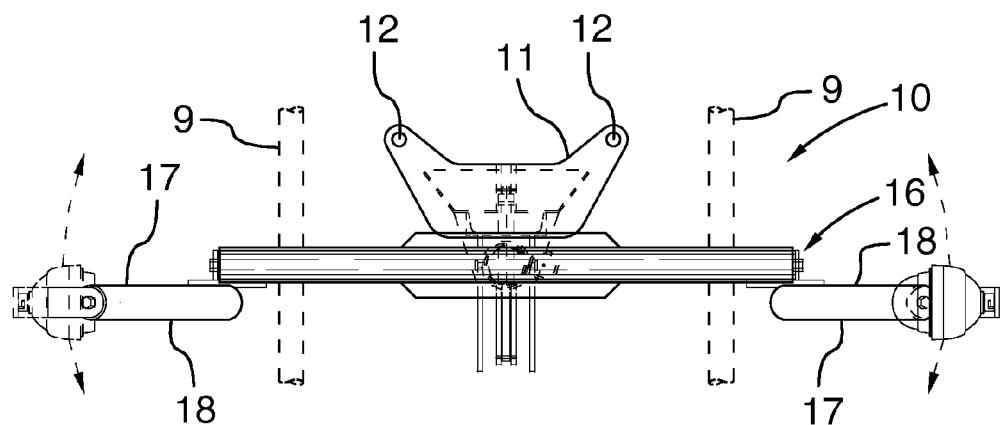
FIG. 4 is a top view of the cable catching device of FIG. 3.
Figure 5:
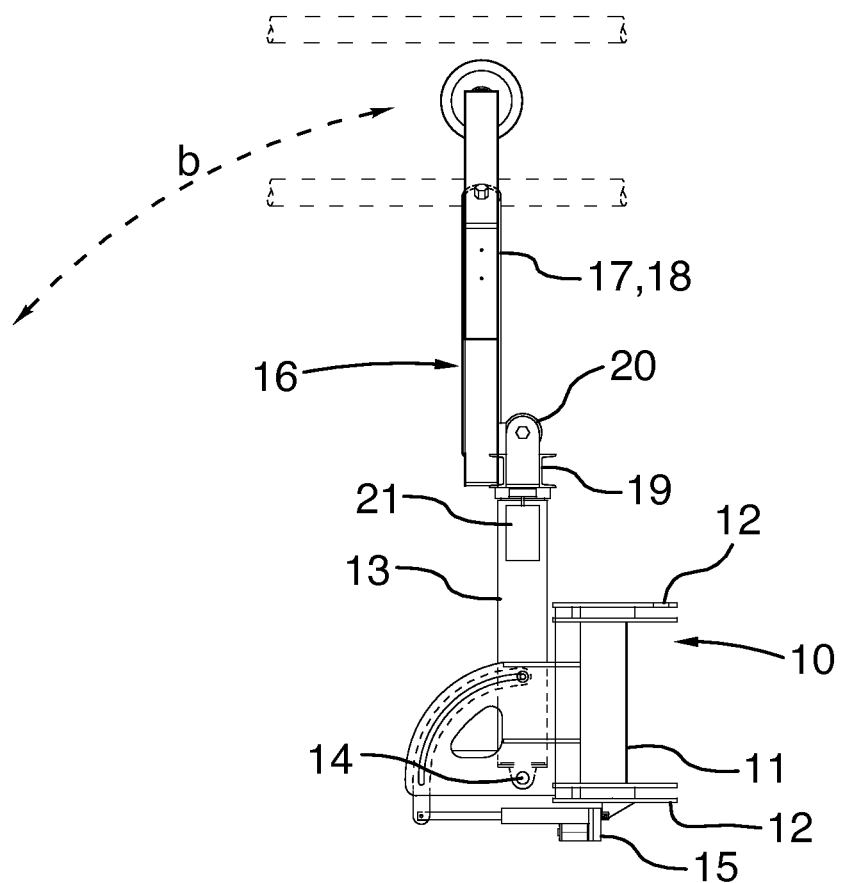
FIG. 5 is a left side view of the cable catching device of FIGS. 3-4.

The use of the boom head brackets 4 to releasably mount a jib boom 5 to the main boom 1 is well known to those skilled in the art. However the present invention uses the same standard boom head brackets 4 and removable pins to removably mount the cable catching device 10 that is shown in FIGS. 3-5, and in use in FIG. 6. Of course to do so, the pins holding the jib boom 5 and the jib boom 5 itself must be removed to free the brackets 4 for mounting the cable catching device 10.

Figure 6:
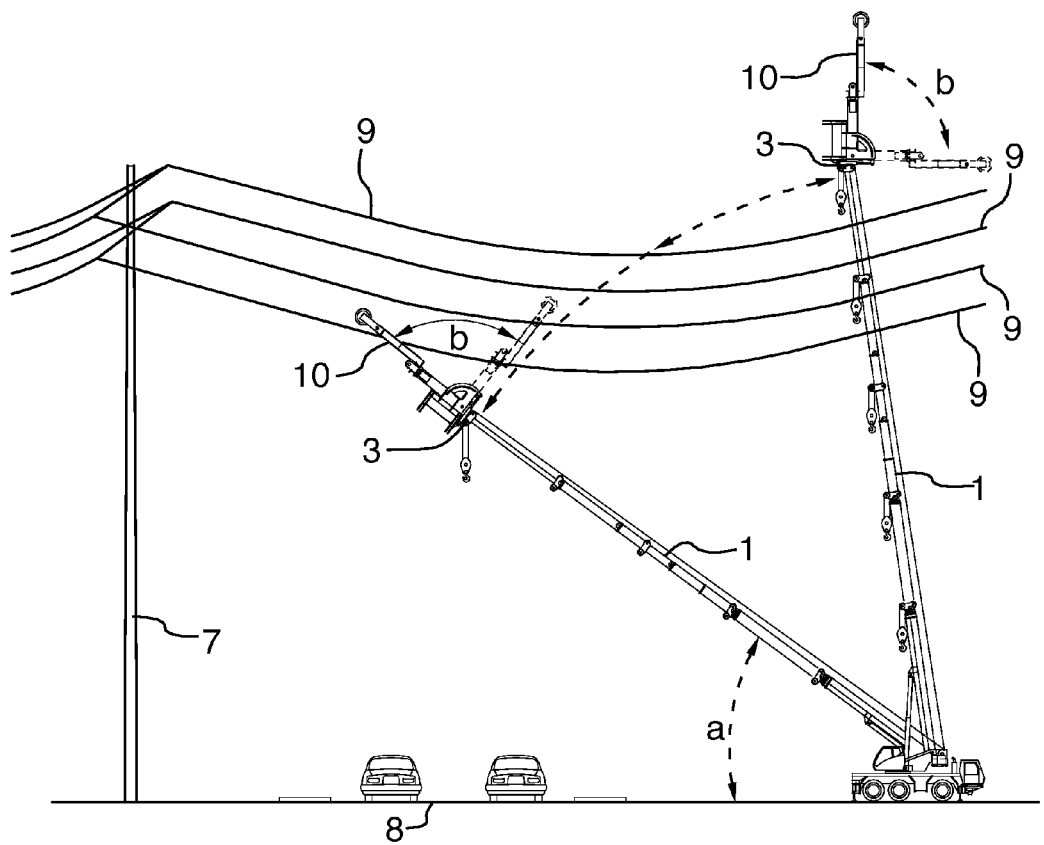
FIG. 6 is an elevation view of the crane of FIGS. 1-2 with the cable catching device of FIGS. 3-5 in an operating position mounted to the boom head of the fully extended telescopic main boom, where the main boom is shown in a fully upright position (right) and in a lowered position (left) where the cable catching device is positioned over a roadway beneath electric cables suspended from a utility pole.

As seen in FIG. 6, the cable catching device 10 is mounted to the boom head 3 of the main boom 1. Use of a telescoping boom 1 and a relatively high capacity crane is likely preferred in many situations because the boom 1 can extend across a roadway 8 from a safe position adjacent the roadway 8 to catch any falling or broken cables 9 without impeding road traffic. The cable catching device 10 has a wide opening that can be positioned and oriented beneath several cables 9 suspended from a utility pole 7 or other equivalent structure. A high weight capacity crane is able to position the boom 1 at a relatively low angle "a" to the ground surface while retaining sufficient boom capacity to catch a heavy cable, absorb the impact of the falling cable and not exceed the crane's overturning capacity. Those skilled in the art will recognize that choice of a crane load capacity, crane position, crane boom 1 length, crane boom angle "a" relative to the ground surface, and yoke mouth opening width of the cable catching device 10 are all dependent on the size and weight of cables 9 and the local conditions of the site during operations. The description that follows is an example and it will be understood that modifications to the device 10 may be required to suit different cranes and operating conditions without departing from the scope of the invention disclosed herein.

FIGS. 3-5 show the details of the cable catching device 10, for installation on the crane boom 1 to catch at least one cable 9, suspended above at least part of the device 10 in the event that the cable 9 falls downwardly.

The cable catching device 10 has a base 11 with parallel plates with pin openings 12 operable with boom head brackets 4 to releasably engage the device 10 with the crane main boom 1. The base 11 can be adapted to suit various types of boom head brackets 4 since different sized cranes and different manufacturers have different arrangements. A removable adapter bracket could be provided as part of the base 11 to adapt the device 10 for specific crane boom head arrangements if necessary.

The base 11 is pivotally attached to a lower end of a post 13 and an upper end of the post 13 extends beyond the base 11. The example in FIG. 5 shows a post 13 mounted on a pivot pin 14 to the base for pivoting about a horizontal axis. A tilt actuator 15 engages the post 13 and the base 11 to move the post 13 relative to the base 11 and main boom 1. In the example shown the tilt actuator 15 is a linear hydraulic cylinder but other options include a rotary hydraulic motor or electric motor and gear reducer combination. The tilt actuator 15 serves to position the post 13 and yoke 16 at a selected angle "b" beneath the cable 9 by the crane operator as seen in FIG. 6.

The catching of falling cables 9 is performed by the yoke 16 that has at least two arms 17 extending upwardly from the upper end of the post 13. Each arm 17 has an upper end laterally spaced apart from the upper end of any adjacent arm 17 thereby defining an upwardly open yoke mouth between the upper ends of the arms 17. The yoke mouth as seen in FIG. 3 is deployed adjacent an underside of the suspended cables 9 where the arms are disposed a distance from the suspended cable 9 and do not normally touch the cables 9 unless a cable 9 is broken or falls accidentally during work involving the cables 9. Each arm 17 has an arm roller 18 with an outer cable contacting surface. The outer insulation or metal surface of a falling cable 9 could be damaged by impact with the yoke 16 and therefore the rollers 18 permit the cable 9 to roll freely after impact with the roller to avoid damage.

In the example shown, the yoke 16 includes a transverse beam 19 joining the upper end of the post 13 and the lower ends of the arms 17. The beam 19 also includes a beam roller 20 with an outer cable contacting surface for the same reason noted above. The length of the beam 19 can be adjusted to suit the spacing of the cables 9 or to fold the device 10 for transportation if necessary. For example the beam 19 could be manufactured to be telescoping or folding with hydraulic actuating cylinders or hinge pins.

The device 10 shown in FIG. 3 has a post 13 with a longitudinal axis and the yoke 16 is rotatably mounted to the post 13 for axial rotation relative to the post 13 with a rotary actuator 21. The rotary actuator 21 is illustrated as a slew gear operable with a spur gear driven by an electric or hydraulic motor. In such an application the post 13 includes an outer stationary tube and an inner rotating tube to permit the slew gear on the inner rotating tube to rotate under the force exerted by the spur gear and motor that are mounted to the stationary outer tube. Other means of rotating the yoke 16 relative to the post 13 are within the general concept of the invention.

To enable a crane operator on the ground level to accurately see the position of the yoke 16 at position the yoke under the cables 9, the yoke 16 can include a camera 22 in wireless communication with an operator display 23.

Using joystick controls 24 for example, the rotary actuator 21 and the tilt actuator 15 can also be arranged as being controlled through wireless communication with the operator control unit 25.

Although the above description relates to a specific preferred embodiment as presently contemplated by the inventor, it will be understood that the invention in its broad aspect includes mechanical and functional equivalents of the elements described herein.

I claim:

1. A cable catching device, comprising:
   a crane boom; and
   a boom end attachment releasably deployed on the crane boom to catch at least one cable, suspended above at least part of the device in the event that the cable falls downwardly, the attachment comprising:
   a base operable with connectors to releasably mount on the crane boom;
   a post having: a lower end engaged with the base; and an upper end extending beyond the base;
   a yoke having at least two arms extending upwardly from the upper end of the post, each arm having an upper end laterally spaced apart from the upper end of any adjacent arm, thereby defining an upwardly open yoke mouth between the upper ends of the arms, the yoke mouth being deployed adjacent an underside of the suspended cable wherein the arms are disposed a distance from the suspended cable; and
   each arm having an arm roller with an outer cable contact surface, each roller being mounted for rotation about an axis oriented to be substantially transverse to an axis of the cable; and
   wherein the yoke includes a transverse beam joining the upper end of the post and the lower ends of the arms, the beam including a beam roller with an outer cable contact surface.

2. The device according to claim 1 wherein the post is pivotably mounted to the base for pivoting about a horizontal axis.

3. The device according to claim 2 wherein the post and base are linked with a pivot pin and a tilt actuator engages the post and the base.

4. The device according to claim 3 wherein the tilt actuator comprises a linear actuator.

5. The device according to claim 1 wherein the post has a longitudinal axis and the yoke is rotatably mounted to the post for axial rotation relative to the post.

6. The device according to claim 5 wherein the yoke and post are engaged with a rotary actuator.

7. The device according to claim 5 wherein the rotary actuator comprises a slew gear operable with a spur gear driven by a motor.

8. The device according to claim 1 wherein the yoke includes a camera in communication with an operator display.

9. The device according to claim 8 wherein the camera is in wireless communication with an operator control unit.

10. The device according to claim 6 wherein the rotary actuator is in wireless communication with an operator control unit.

11. The device according to claim 3 wherein the tilt actuator is in wireless communication with an operator control unit.

\* \* \* \* \*